United States Patent [19]

Taniyama

[11] Patent Number: 5,344,039

[45] Date of Patent: Sep. 6, 1994

[54] STORAGE CONTAINER

[76] Inventor: Yoshihiko Taniyama, 9380 Old Southwick Pass, Alpharetta, Ga. 30202

[21] Appl. No.: 941,670

[22] Filed: Sep. 8, 1992

[51] Int. Cl.$^5$ .............................................. B65D 85/00
[52] U.S. Cl. .................................... 220/520; 206/309
[58] Field of Search .................. 220/520, 4.22, 4.23, 220/520; 206/309, 444

[56] References Cited

U.S. PATENT DOCUMENTS

| | | | |
|---|---|---|---|
| 3,243,838 | 4/1966 | Blumberg | 220/338 X |
| 4,535,888 | 8/1985 | Nusselder | 206/444 |
| 4,613,044 | 9/1986 | Saito et al. | 206/444 |
| 4,702,369 | 10/1987 | Philosophe | 206/309 |
| 4,750,611 | 6/1988 | Morrone | 206/45.13 |
| 4,793,479 | 12/1988 | Otsuka et al. | 206/309 X |
| 4,793,480 | 12/1988 | Gelardi et al. | 206/312 |
| 4,817,792 | 4/1989 | Seifert | 206/309 |
| 4,819,799 | 4/1989 | Nomula et al. | 206/310 |
| 4,844,260 | 7/1989 | Jaw | 206/444 |
| 4,850,477 | 7/1989 | Gelardi et al. | 206/45.19 |
| 4,874,085 | 10/1989 | Grobecker et al. | 206/444 X |
| 4,875,743 | 10/1989 | Geldardi et al. | 312/13 |
| 4,895,252 | 1/1990 | Nomula et al. | 206/310 |
| 4,899,875 | 2/1990 | Herr et al. | 206/313 |
| 4,916,567 | 4/1990 | Grobecker et al. | 360/133 |
| 4,998,618 | 3/1991 | Borgions | 206/307 |
| 5,050,734 | 9/1991 | Chen | 206/444 |
| 5,101,971 | 4/1992 | Grobecker | 206/232 |
| 5,135,106 | 8/1992 | Morrone | 206/309 X |
| 5,145,068 | 9/1992 | Schmitz et al. | 206/472 |

FOREIGN PATENT DOCUMENTS 0420350  4/1991  European Pat. Off. ............ 206/310

*Primary Examiner*—Steven M. Pollard
*Attorney, Agent, or Firm*—Troutman Sanders

[57] ABSTRACT

A storage container for mini-disk cartridges and the like is described, which includes a hingedly connected upper shell and lower shell. Each shell includes a front wall and side walls extending upwardly from their bottom inside surfaces. Support elements protruding upwardly from the bottom inside surface of each shell meet when the container is in the closed position.

13 Claims, 8 Drawing Sheets

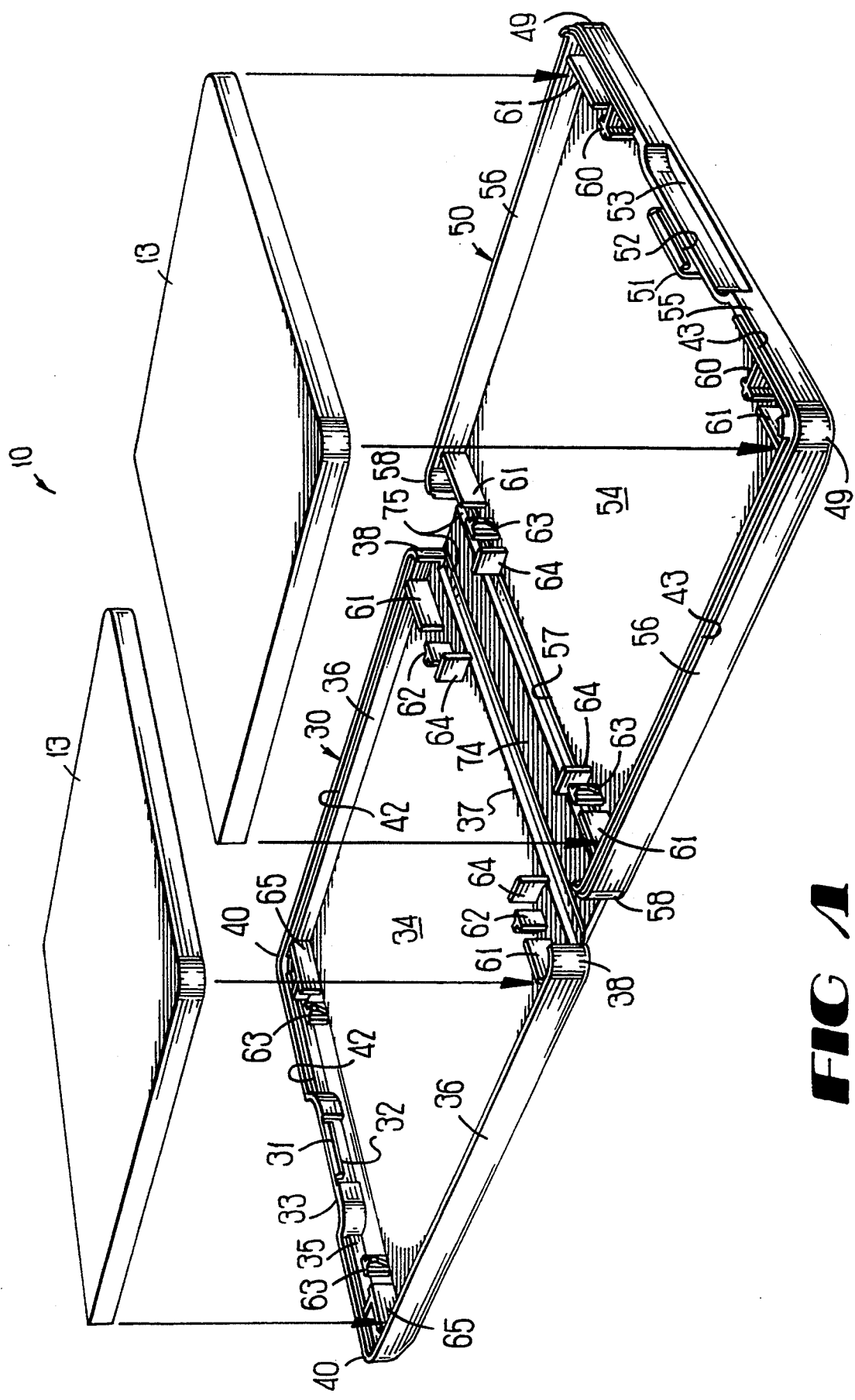

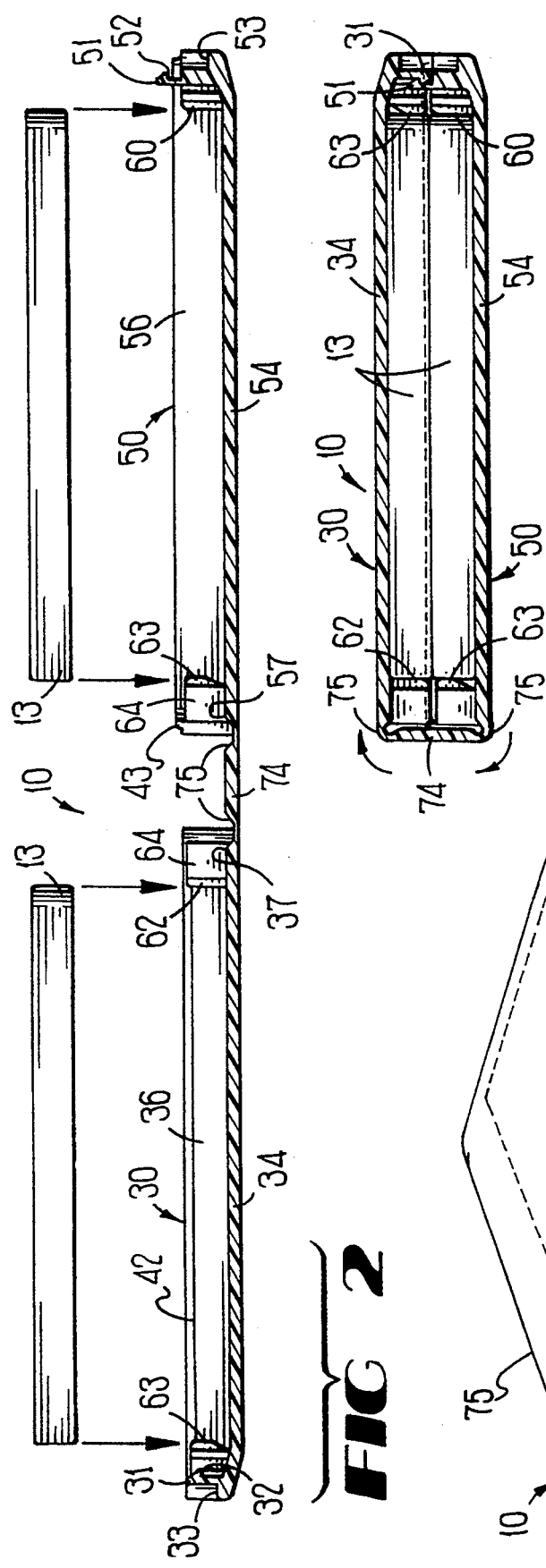
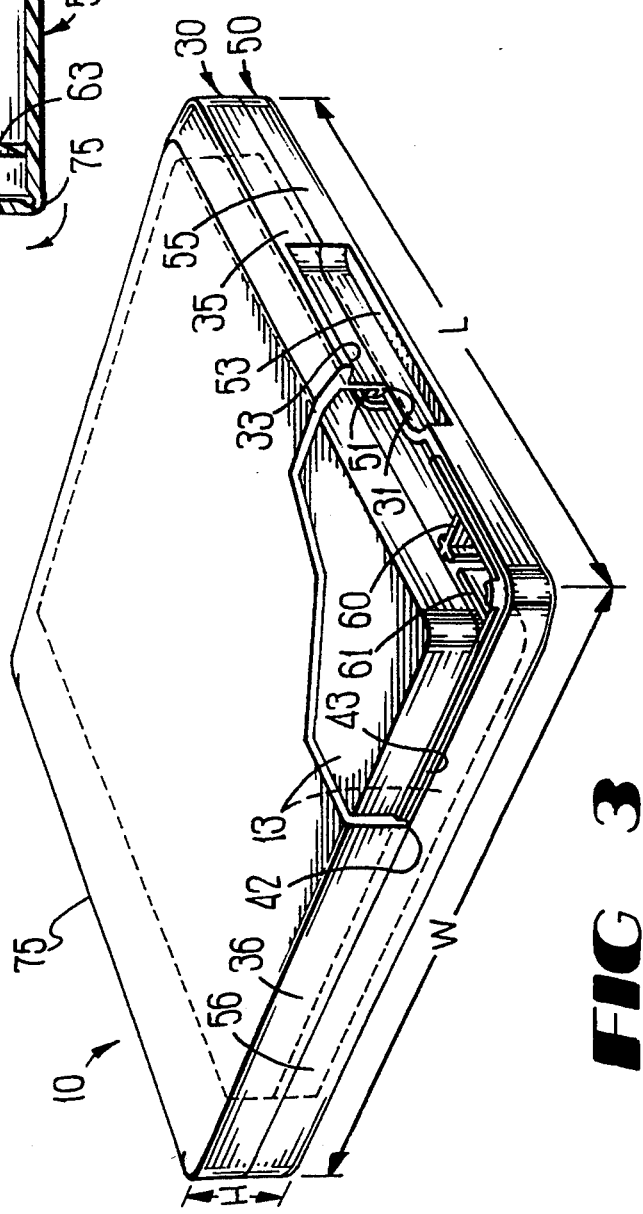

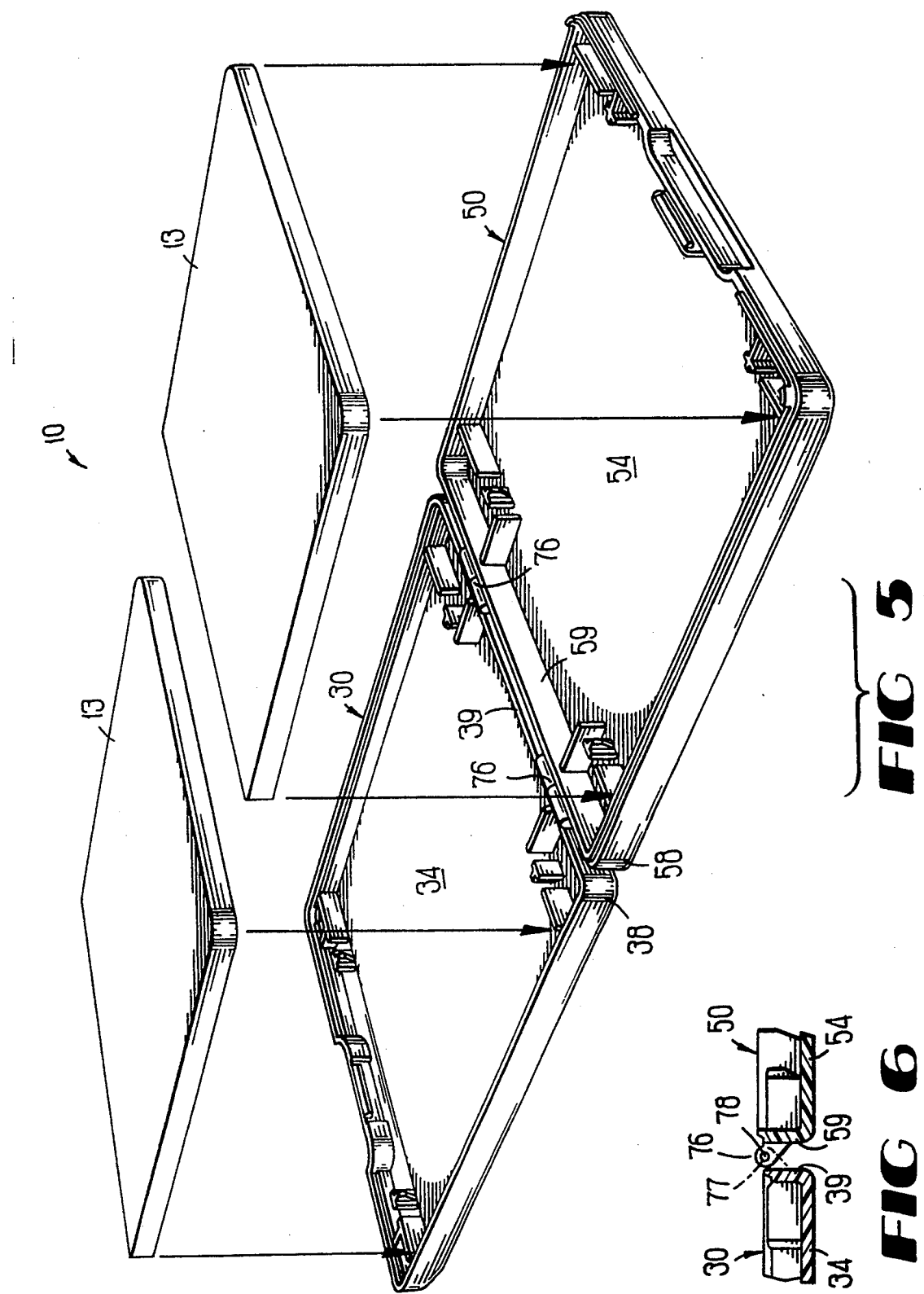

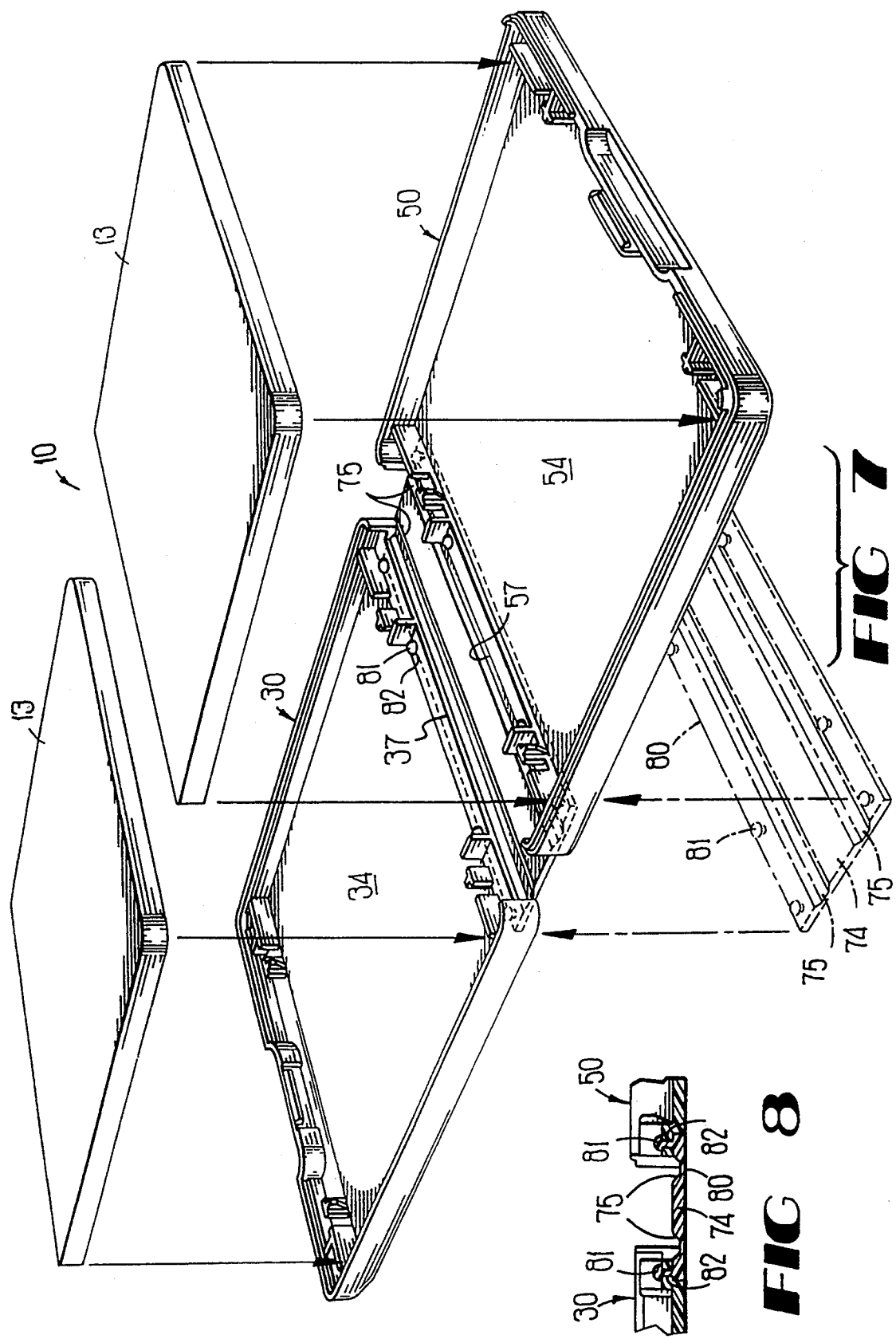

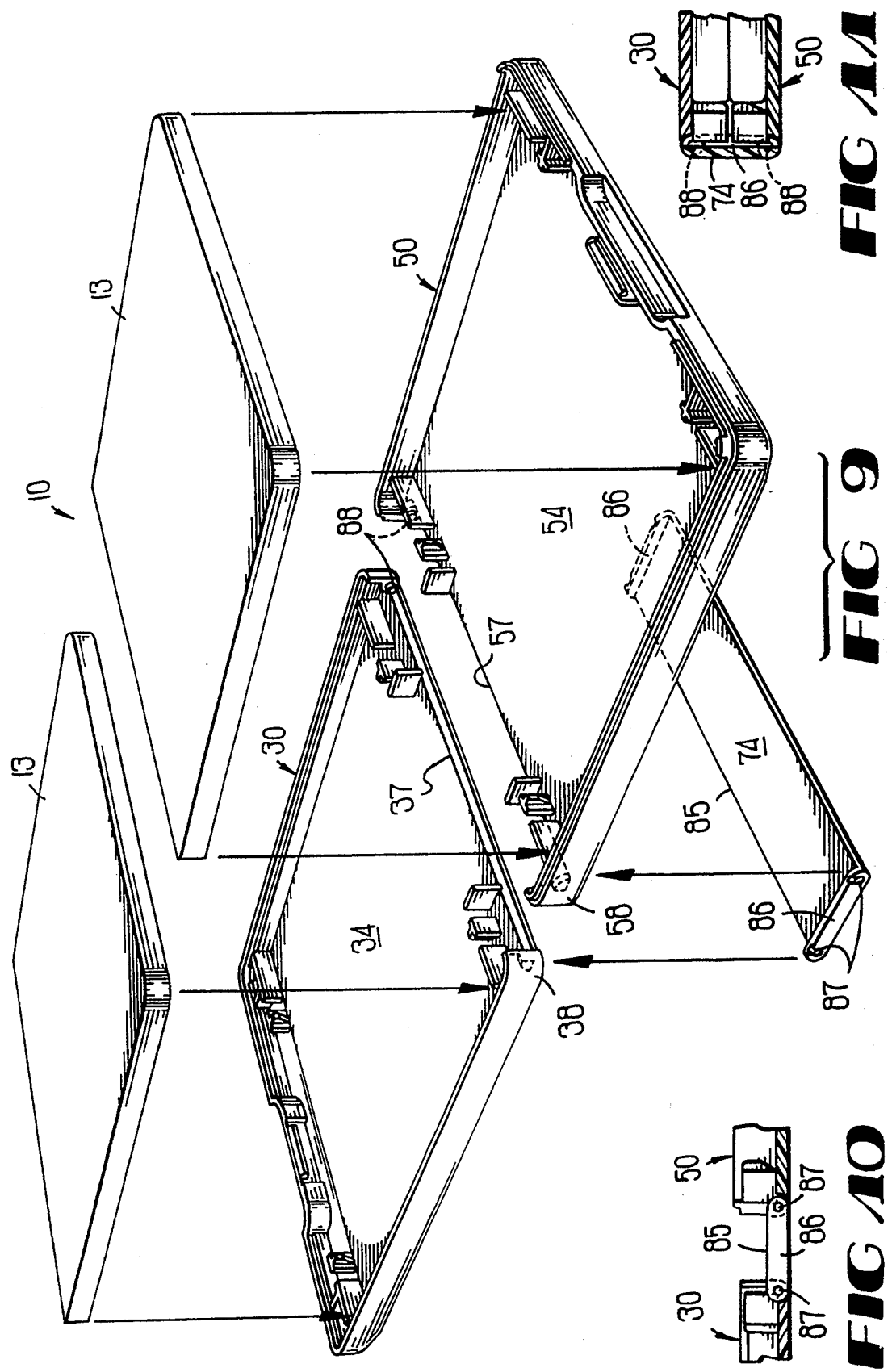

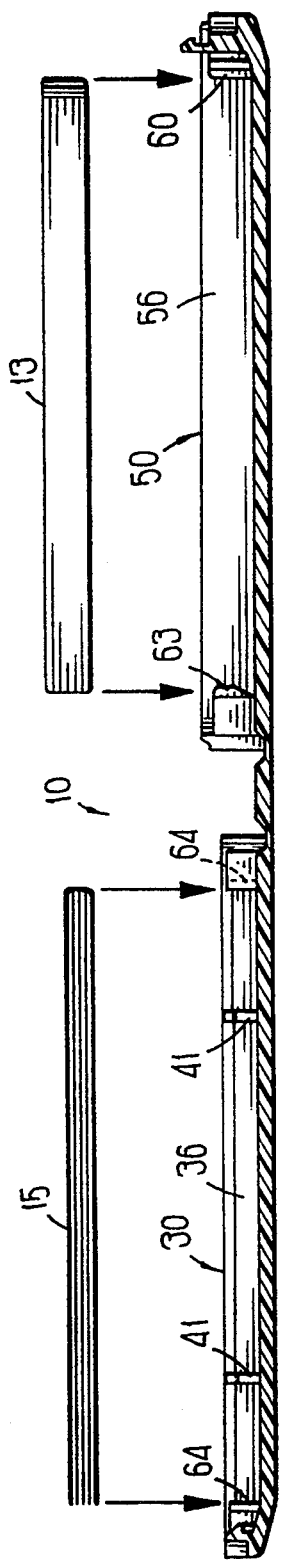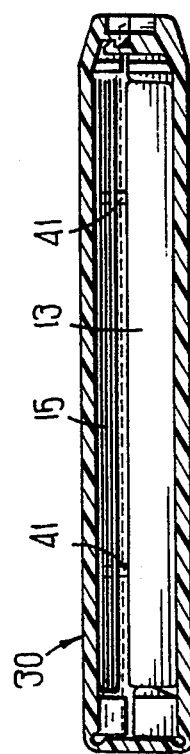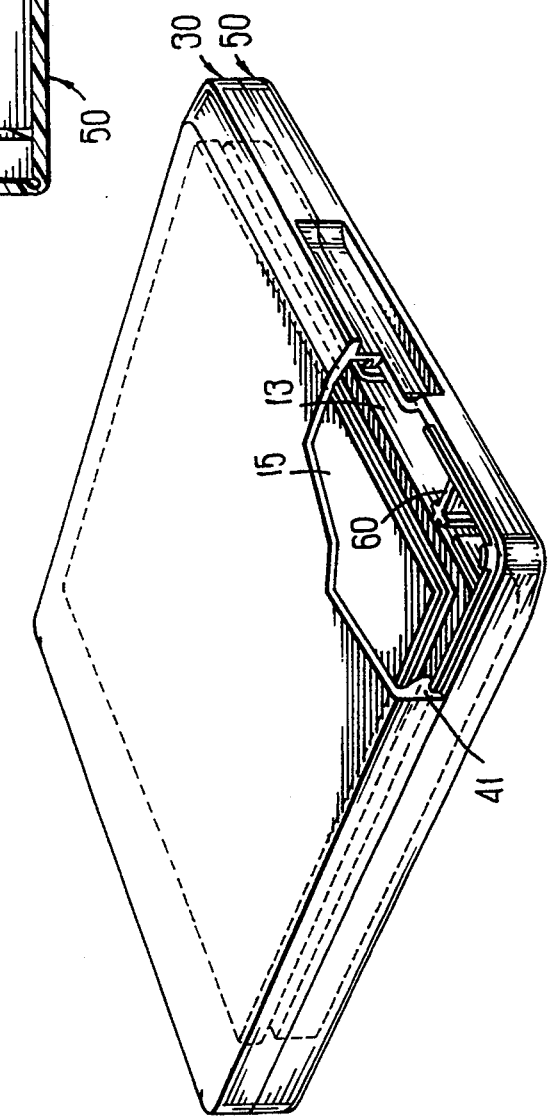
FIG. 13
FIG. 15
FIG. 14

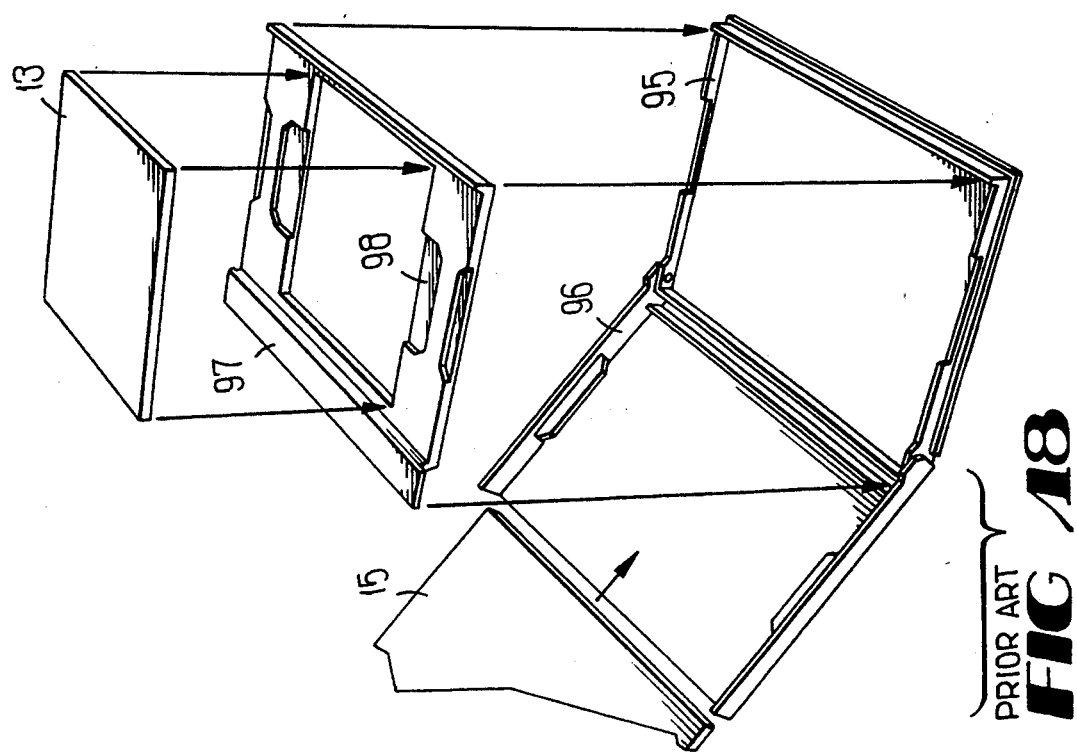
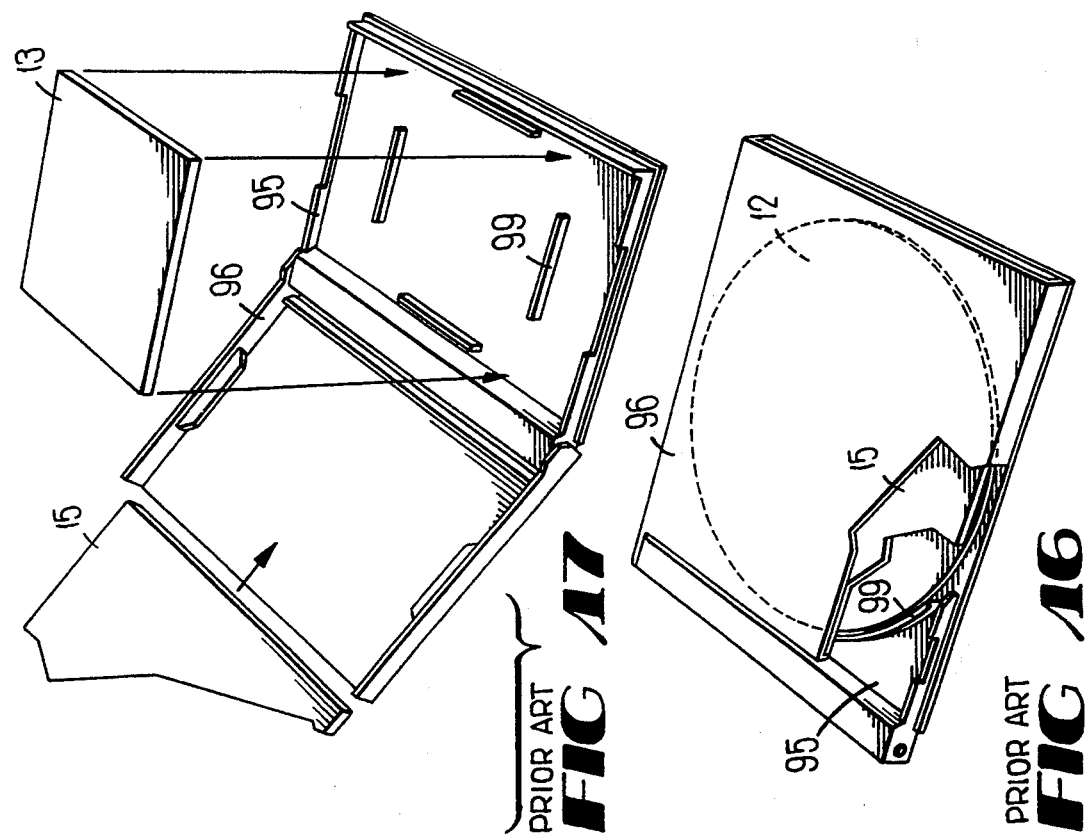

STORAGE CONTAINER

BACKGROUND OF THE INVENTION

1. Field of Invention.

This invention relates to a storage case for disks. More specifically, this invention relates to a one, two or three-component container in which information storage media, such as a mini-compact disk ("mini-CD") cartridges and the like, may be packaged for retail sale and/or used for storage by the consumer.

2. Description of the Prior Art.

As shown in FIGS. 16 to 18, conventional storage containers for objects such as compact disks 12 (See FIG. 16), mini-disk cartridges 13 (see FIGS. 17 and 18), and the like are often called jewel boxes. Typically, the jewel box is usually made of transparent plastic, such as polystyrene.

Due to the use of transparent plastic for these containers, many such jewel boxes include at least two and often three distinct components. As shown in FIGS. 16 and 17 a two component container usually consists of a base tray 95 and a cover 96, which are hingedly connected at their rear side edges to form a clam shell like enclosure. In these embodiments, the inside floor of the base tray 95 often has rimmed extensions which substantially surround the object so that it remains secure in the container. As shown in FIG. 18, a disk tray 97 may be added to the container to replace the rimmed extensions 99 and add additional features such as a finger insert 98.

Typically, most conventional storage containers are designed for retail sale use so that the consumer may easily view the contents of the container such that they will be persuaded to purchase it. In doing so, these containers are often inefficient in that they take up a lot of unnecessary space on the retail racks because they are often similar in size to audio cassette cases. Further, a significant amount of space within these containers is not utilized.

The above features of the prior art limit the number of containers which may be displayed in a retail rack and increase the amount of raw material which is required to produce each container. A need exists, therefore, for a container which will catch the consumers eye by being cosmetically pleasing, and which will more efficiently utilize the space within the container and the materials used to manufacture it.

SUMMARY OF THE INVENTION

Accordingly it is an object of this invention to provide a container for mini-disk cartridges or the like which more efficiently uses the space within the container.

It is another object of this invention to provide a container for mini-disk cartridges or the like which decreases the amount of material needed to produce such a container.

It is yet another object of this invention to provide a container for mini-disk cartridges or the like which is easy to use and is cosmetically appealingly to the user.

It is a further object of this invention to provide a container for mini-disk cartridges or the like, in which a booklet or promotional material may alternatively be stored within the container.

These and other objects are achieved by the container of the present invention, which may be applied for example to mini-disk cartridges or standard compact disks. In a first configuration of the preferred embodiment, the container is formed of a unitary piece of flexible plastic material, such as polypropolene. This material allows a "living hinge" (a strip of plastic with a notch having a reduced thickness such that it may bend without being broken) to be formed between an upper and a lower shell so that the container may be molded as unitary component. The the width of a prefered embodiment of the container is slightly greater than the width of a typical mini-disk cartridge. This feature allows support elements to be employed within the container. The length of this embodiment is slightly greater than the length of a typical mini-disk cartridge. Finally, the height of this preferred embodiment is slightly greater than the height of two mini-disk cartridges when one is stacked on top of the other. The above combinations of dimensions leads to a significant amount of material savings in comparison to the typical mini-disk containers currently known and produced. Further, when used for storing mini-disk cartridges, the container may be formed to closely resemble a woman's powder case, and be designed to be quickly accessible and easy to use.

The upper and lower shells may each be formed to contain one mini-disk cartridge. They may be designed to appear as almost mirror-like images of each when viewing an open container from above. Both shells have two side walls and a front wall which are slightly taller than the height of a mini-disk cartridge. The side walls and front walls of the shells combine to define the height of the container.

One or more supports formed on the floor of each shell extend inwardly from each wall and from the rear portion of each shell. The supports are preferably positioned in corner portions of each shell. Support on the lower shell may preferably have a correspondingly mirror-image positioned support on the upper shell. Preferably, the supports have a height slightly less than the height of a mini-disk cartridge. The height of the supports allows the mini-disk cartridge casings to supply the majority of the shape and support to the container. However, additional support to the container is provided by these supports.

The supports may be rectangular, square, T-shaped or cross-like or may take any other reasonable shape that will allow it to give added strength to the container. Preferably, at least one rectangular tab protrudes from the front and rear side portions of the walls of each shell and at least one relatively square tab extends from the outer rear portions of each shell.

At least one T-shaped support is preferably formed near to the rectangular and square tabs in the four corner portions of each shell. Preferably, the supports are positioned such that the T-shaped supports closest to the same side wall are separated by a distance approximately equal to the width of mini-disk cartridge. Therefore, these supports not only provide additional stability to the container, but serve to secure the mini-disk cartridge when it is inserted into the shell by creating an interference fit along the edges of the cartridge.

One or more of the T-shaped tab supports may be tapered at the bottom to provide additional stability when the mini-disk cartridge rests against it. Therefore, the support not only contributes a frictional interference to maintain the mini-disk cartridge in place. It also provides increased flexibility where the full support does not touch the inside floor of the shell, thereby allowing the shell to more easily conform to the shape of the mini-disk cartridge. The tapered bottoms of the T-shaped support may also be utilized as a clamplike mechanism that applies downward force on the outer edges of promotional material or the like having similar length and width dimensions of a mini-disk cartridge, which may be inserted into either shell. Though the supports employed to secure the mini-disk cartridge within the shell are preferably T-shaped, almost any other shaped support may be utilized as long as it provides the similar attributes as the T-shaped support.

Though the shapes and positions of the supports as discussed are preferred, they may be reshaped and repositioned for various uses of the storage container. For example, more thin square or rectangular supports could be added along the side walls in parallel with the side walls to provide additional support to the side edge of the shells.

Preferably the front portion of each shell has a correspondingly matching recessed portion that may be used as a finger grip when opening the container. A raised latch with a lip extending outward protrudes upward from the recessed portion of the lower shell, while a corresponding lip extends inward from the recessed portion of the upper shell. When the container is in the closed position, the lower shell lip and the upper shell lip become matingly engaged to create a locking mechanism for the container. When the user of the container applies shell separating pressure where the recessed finger grips of each shell meet, the upper shell lip is easily dislodged from the lower shell lip and the container may be opened.

The rear portion of each shell is preferably flat (without a rear wall). This feature allows the user of the container to easily retrieve the mini-disk cartridge from the container by creating a finger insertion area.

The upper shell and the lower shell are connected by a living hinge, which is part of the one piece of continuous flexible material utilized to form the container. The hinge extends from the lower rear portion of both shells and forms a rear wall for the container when the container is in the closed position. Preferably, the length of the hinge is slightly shorter than the length of the container so curved corners on the rear portions of both the upper shell and the lower shell are employed to complete the rear portion of the container in the closed position. Preferably, the width of the hinge is approximately the height of the container.

In a second configuration, a two piece container may be formed with an upper shell and a lower shell. This container may be formed of almost any plastic material, including a transparent plastic such as polystyrene or a flexible plastic such as polypropolene. The features of the container and each shell closely resemble those features of the first configuration. However, the shells are hingedly connected by at least one ball and socket hinge, portions of which are formed on the rear of each shell. Though a ball and socket hinge is preferred, other similar hinged means may be utilized for this configuration.

For this configuration, both shells have rear walls extending upward from the rear portion of the shell. For the ball and socket hinge, preferably, the ball portion of the hinge is formed on the rear wall of the upper shell and extends outward, while the socket portion of the hinge is correspondingly formed on the rear wall of the lower shell and also extends outward. When the ball and socket portions of the hinge are mated, they create a snap fit plastic hinge.

In a third configuration, a three piece container may be constructed with an upper shell, a lower shell, and a hinge. Like the second configuration, this container may be formed of almost any plastic material and the features of each shell closely resemble those features of the first configuration.

For this configuration, the shells are connected by a detachable hinge. In one embodiment, the detachable hinge may be a living hinge with snap holes made of a plastic material such as polypropolene. The rear portion of each shell has a recessed portion on its exterior running the length of the rear portion from one corner to the other corner. The rear portion of each shell may also have at least one, but preferably four holes in which a snap may be inserted to secure the detachable living hinge to the rear portion of the shell. To secure the hinge to the shells, the outer edges of the living hinge are inserted into the recessed portion of each shell and a snap, such as a mushroom snap, is inserted through the hole or holes in the inner rear portion of each shell and into the hole or holes of the detachable living hinge. This type of hinge is designed to give the rear portion of the container a smooth cut look when it is in the closed position.

In another embodiment of the third configuration, the detachable hinge may be a rigid hinge plate made of a plastic material, such as polystyrene. The side edges of the hinge plate has side walls extending upward with each having two holes on its outer portion. For this embodiment, the rear corner walls of both shells have protrusions extending inward. The holes in the hinge plate are matingly engaged with the protrusions extending from the rear corner walls to secure the hinge to each shell. This type of hinge is also designed to give the rear portion of the container a smooth cut finish. Though the living hinge and rigid plate are the two preferred detachable hinges, any similar hinge may be employed for this embodiment.

In a fourth configuration, the height of the upper or lower shell for the previous three configurations may be shortened or lengthened to adapt to a booklet, promotional material or the like, which may be enclosed in the container. For this container, at least one, but preferably two tapered protrusions may be formed in each side wall of the shell such that they extend inward. These protrusions allow the outer portions of the booklet, promotional material or the like to be secured in place under the tapered portions of the protrusions which act somewhat like a clamping mechanism. Also, square or rectangular supports running parallel with the front wall and rear portion may be substituted for the T-shaped supports in the upper shell of the first three preferred embodiments since the interference fit may no longer be needed.

BRIEF DESCRIPTION OF THE DRAWINGS

The accompanying drawings illustrate several presently preferred, but nevertheless illustrative, embodiments of the invention and serve to aid in the explanation of the principles of the invention.

FIG. 1 is an exploded perspective view of the one-piece container in the open position with the mini-disk cartridges ready for insertion into the upper and lower shells.

FIG. 2 is a longitudinal cross-sectional view of the one-piece container in the open position with the mini-disk cartridges ready for insertion into the upper and lower shells.

FIG. 3 is a cut away perspective view of the one-piece container in the closed position with the mini-disk cartridges inserted into the upper and lower shells.

FIG. 4 is a longitudinal cross-sectional view of the one-piece container in the closed position with the mini-disk cartridges inserted into the upper and lower shells.

FIG. 5 is an exploded perspective view of the two piece container having a ball and socket hinge in the open position, with the mini-disk cartridges ready for insertion into the upper and lower shells.

FIG. 6 is an isolated cross-sectional view of the ball and socket hinge utilized in the two piece container in the open position.

FIG. 7 is an exploded perspective view of the three-piece container having a detachable living hinge in the open position, with the mini-disk cartridges ready for insertion into the upper and lower shells.

FIG. 8 is an isolated cross-sectional view of the detachable living hinge employed in the three-piece container in the open position.

FIG. 9 is an exploded perspective view of the three-piece container having a detachable hinge plate in the open position, with the mini-disk cartridges ready for insertion into the upper and lower shells.

FIG. 10 is an isolated cross-sectional view of the detachable hinge plate utilized in the three-piece container in the open position.

FIG. 11 is an isolated cross-sectional view of the detachable hinge plate employed in the three-piece container in the closed position.

FIG. 13 is a longitudinal cross-sectional view of the one-piece container in the open position with a promotional booklet and a mini-disk cartridge ready for insertion into the upper shell and lower shell respectively.

FIG. 14 is a cut away perspective view of the one-piece container in the closed position with a promotional booklet and a mini-disk cartridge inserted into the upper shell and lower shell respectively.

FIG. 15 is a longitudinal cross-sectional view of the one-piece container in the closed position with a promotional booklet and a mini-disk cartridge inserted into the upper shell and the lower shell respectively.

FIG. 16 is a cut away perspective view of a prior art two-piece standard compact disk container in the closed position.

FIG. 17 is an exploded perspective view of a prior art two-piece mini-disk cartridge container in the open position.

FIG. 18 is a exploded perspective view of a prior art three-piece mini-disk cartridge container in the open position.

DETAILED DESCRIPTION OF ILLUSTRATIVE EMBODIMENTS

Figure 12:
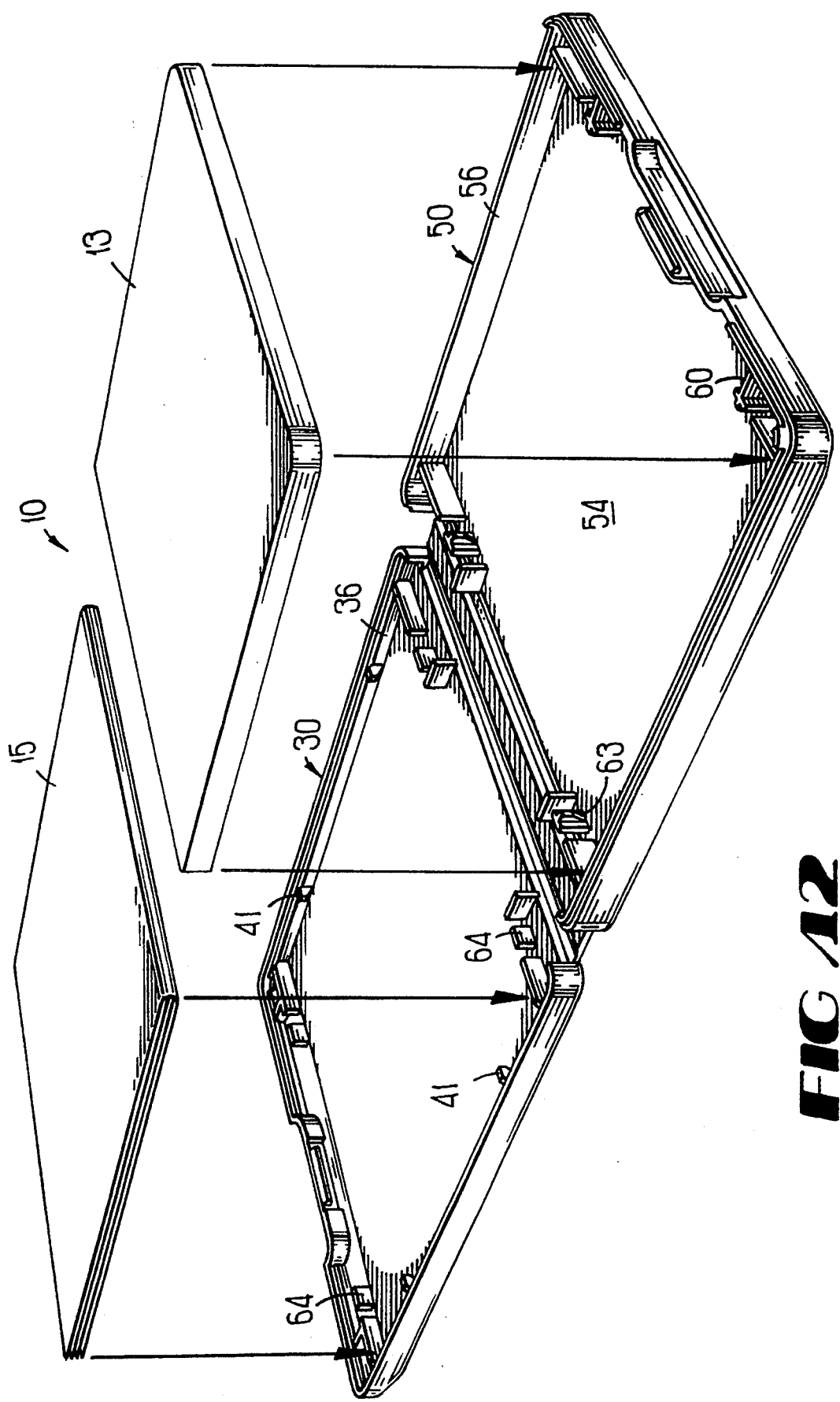
FIG. 12 is an exploded perspective view of the one-piece container in the open position with a promotional booklet and a mini-disk cartridge ready for insertion into the upper shell and lower shell respectively.

As shown in FIGS. 1 and 4, in a first configuration of the preferred embodiment of the invention, a storage container 10 is preferably formed of a flexible plastic material, such as polypropolene. The container 10 in this first embodiment is formed of one continuous piece of the flexible material such that an upper shell 30, a lower shell 50, and two living hinges 75 are fashioned.

Though the dimensions of the container 10 may vary to adapt different sized mini-disk cartridges 13 or other six sided, three dimensional objects known as hexahedrons, a preferred embodiment is designed for a typical mini-disk cartridge 13 in which an optical disc is encased in a rectangular enclosure. The preferred width of the container is approximately 82 millimeters, the length is approximately 76 millimeters, and the height is approximately 13.2 millimeters (see FIG. 3). The length and height are designed to be approximately the same length and height of two typical mini-disk cartridge 13 stacked one on top of the other, while the width is slightly longer to accommodate support elements within the container 10 among other purposes.

The upper shell 30 includes two side walls 36 and a front wall 35, which extend perpendicularly upward from an inside floor surface 34 of the upper shell 30. At the front of the upper shell 30, the front wall 35 and side walls 36 meet at front corners 40. The rear portion of each side wall 36 is preferably curved, though they may be squared or angled, to form rear corner walls 38. The upper shell 30 preferably has a relatively flat rear 37, which runs along the entire rear portion of the upper shell 30 until it meets the rear corners walls 38. This flat rear edge 37 allows the user of the container 10 to more easily remove the mini-disk cartridge 13 by inserting his fingers along the rear edge 37.

Various supports, approximately the height of a mini-disk cartridge 13, are utilized to furnish additional strength and shape to the container 10. They are preferably employed in the corner regions of the upper shell 30 in the additional area created by having the width of the container 10 longer than the width of the mini-disk cartridge 13. This additional area is preferably split evenly on the front and the rear outer edges.

A right angle support 65, with a tiny extension parallel to the front wall 35, may be formed to the inside floor surface 34. It may extend to the side wall 36 and the front wall 35 in, at least one, but preferably both the front corner portions of the upper shell 30.

A tapered T-shaped support 63, which is tapered at its bottom, may be formed to the inside floor surface 34 in at least one, but preferably both front corner portions of the upper shell 30 (See FIG. 2). They may be positioned in close proximity to each right angle support 65 but should be placed further inward along the front wall 35. The tapered T-shaped supports 63 should be positioned such that they may contribute to securing mini-disk cartridge 13 when it is inserted into the upper shell 30. Further, each tapered T-shaped support 63 is tapered at the bottom causing less surface area to be in contact with the inside floor 34. This allows the upper shell 30 to be more flexible such that it is better able to conform to the shape of the mini-disk cartridge 13. Preferably, the edge of each tapered T-shaped support 63 closest to the front wall 35 and each portion of the right angle support 65 extending to the side wall 36 should be approximately an equal distance from the front wall 35. The tapered bottom of each tapered T-shaped support 63 may also be employed to secure a booklet, promotional material, or the like upon insertion into the upper shell 30.

A rectangular support 61 may be formed to the inside floor surface 34 in at least one, but preferably both rear corner portions of the upper shell. It may extend to the rear portion of the side walls 36.

A standard T-shaped support 62, similar to the tapered T-shaped 63, except without the tapered bottom, may be formed on the inside floor surface 34 in at least one, but preferably both rear corner portions of the upper shell 30. They may be positioned in close proximity to each rectangular support 61, but are preferably placed further inward along the rear edge 37 of the upper shell 30. Each standard T-shaped support 62 should be positioned such that it may contribute to securing the mini-disk cartridge 13 in place by providing a frictional interference to the cartridge 13 when it is inserted into the upper shell 30. Preferably, the edge of the standard T-shaped support 62 closest to the rear edge 37 and the rectangular support 61 extending to the side wall 36 should be approximately an equal distance from the rear edge 37.

A square support 64, though it may be retangular, may be formed on the INSIDE floor surface 34 in at least one, but preferably both rear corner portions of the upper shell 30. The square support 64 may extend in close proximity to the rear edge 37 and may be positioned in close proximity to both the rectangular support 61 and the standard T-shaped support 62, but should be located further inward along the rear edge 37 of the upper shell 30.

A recessed portion may be formed in the central region of the upper shell's front wall 35, which may be utilized as an upper finger grip 33 when opening the container 10 (see FIG. 3). The upper finger grip 33 may have a recessed latch 31 on its inside surface with a lip 32 extending inward from the recessed latch 31.

The walls 35, 36, and 38 of the upper shell 30 preferably have a slightly recessed area 42. This recessed area 42 preferably extends from the rear corner walls 38, along the side walls 36, and along the front wall 35 but stops at the upper finger grip 33. The front corners 40 may have a slightly deeper recessed area 42 than the rest of the walls 35, 36, and 38 of the upper shell 30.

The lower shell 50 includes two side walls 56 and a front wall 55, which extend perpendicularly upward from an inside floor surface 54 of the lower shell 50. At the front of the lower shell 50, the front wall 55 and the side walls 56 meet at front corners 49. The rear portion of each side wall 56 is preferably curved, though they may be squared or angled, to form rear corner walls 58. The lower shell 50 preferably has a relatively flat rear edge 57, which runs along the entire rear portion of the lower shell 50 until it meets the rear corner walls 58. This flat rear edge 57 allows the user of the container 10 to more easily remove the mini-disk cartridge 13 by inserting his fingers along the rear edge 57.

Supports in the lower shell 50, similar in shape, height, and placement to those in the upper shell 30, should be employed such that each upper shell support may work in tandem with a lower shell support to provide additional resilience and form to the container 10. Therefore, like the upper shell 30, the lower shell's supports are preferably formed in the corner regions of the lower shell 50 in the additional areas created by having the width of the container 10 longer than the width of the mini-disk cartridge 13. Much like the upper shell 30, the additional area is preferably divided evenly among the front and rear edges of the lower shell 50.

For every right angle support 65 formed in the upper shell 30, a rectangular support 61 should be formed to the inside floor surface 54 of the lower shell 50. The rectangular support 61 should correspond in position to the matching right angle support 65 so that their top surfaces may become engaged when the container is in the closed position. Each rectangular support 61 in the lower shell 50 may extend to the side wall 56.

For every tapered T-shaped support 63 formed in the upper shell 30, a crosslike support 60 should be formed on the inside floor surface 54 of the lower shell 50. However, a crosslike support 60 may be positioned in the lower shell 50 similar to the position of the tapered T-shaped support 63 described for the upper shell 30, even if the tapered T-shaped support for the upper shell 30 is not employed. The crosslike support 60 should correspond in position to the matching tapered T-shaped support 63 so that their top surfaces may become engaged when the container 10 is in the closed position. Each crosslike support 60 in the lower shell 50 may extend to the front wall 55. Further, it may contribute to securing the mini-disk cartridge 13 in place by providing a frictional interference to the cartridge 13 when it is inserted into the lower shell 50.

For every rectangular support 61 formed in the upper shell 30, a rectangular support 61 should be formed to the inside floor surface 54 of the lower shell 50. The lower shell's rectangular support 61 should correspond in position to the matching upper shell's rectangular support 61 so that their top surfaces may become engaged when the container 10 is in the closed position. Each rectangular support 61 in the lower shell 50 may extend to the side wall 56.

For every standard T-shaped support 62 formed in the upper shell 30, a tapered T-shaped support 63, like that described for the upper shell 30, should be formed on the inside floor surface 54 of the lower shell 50 (See FIG. 2). However, a tapered T-shaped support 63 may be positioned in the lower shell 50 in a location similar to the position of the standard T-shaped support 62 described for the upper shell 30, even if the standard T-shaped support 63 for the upper shell 30 is not employed. The tapered T-shaped support 63 should correspond in position to the matching standard T-shaped support 61 so that their top surfaces may become engaged when the container 10 is in the closed position. Each tapered T-shaped support 63 in the lower shell may contribute to securing the mini-disk cartridge 13 in place by providing a frictional interference to the cartridge 13 when it is inserted into the lower shell 50. Further, since the tapered T-shaped support 63 is tapered at the bottom, less of its surface area is formed to the inside floor 54, which allows the lower shell 50 to more flexibly conform to the shape of the mini-disk cartridge 13. The tapered bottom may also be utilized to secure a booklet promotional materials 15, or the like upon insertion into the lower shell 50.

For every square support 64 formed in the upper shell 30, a square support 64 should be formed in the lower shell 50. The lower shell's square support 64 should correspond in position to the matching upper shell's square support 64 so that their top surfaces may become engaged when the container 10 is in the closed position. Each square support 64 in the lower shell 50 may extend to the rear edge 57.

A recessed portion may be formed in the central region of the lower shell's front wall 55, preferably corresponding in shape and position to the recessed area in the upper shell's front wall 35. This recessed portion may be employed as a lower finger grip 53 when opening the container 10 (See FIG. 3). The lower finger grip 53 may have a raised latch 51 extending upward from the top edge of the lower finger grip 53 with a lip 52 extending outward from the raised latch 51. Both the raised latch 51 and its lip 52 should preferably correspond in position to the recessed latch 31 and its lip 32 on the upper shell's finger grip 33.

The upper edges of the walls 55, 56, and 58 of the lower shell 50 preferably have a slightly raised lip 43. This raised lip 43 preferably extends from the rear corners 58, along the side walls 56, and along the front wall 55 but stops at the lower finger grip 53. The front corners 49 may have a slightly higher raised lip 43 than the rest of the walls 55, 56, and 58 of the lower shell 50.

The upper shell 30 and the lower shell 50 are connected by two living hinges 75 having a common wall 74, which are included as part of the one piece of continuous flexible material employed to form the container 10. Preferably, the living hinges 75 extend from the lower portion of the rear edge 37 of the upper shell 30 and the lower portion of the rear edge 57 of the lower shell 50. Preferably, the length of each living hinge 75 is slightly shorter than the length of the container 10. Therefore, its outer edges preferably meet the rear corner walls 38 of the upper shell 30 and the rear corner walls 58 of the lower shell 50. Preferably, the width of the common wall 74 is slightly less than the height of the container 10.

As shown in FIG. 4, when the container 10 is in the closed position, the living hinge 75 forms a rear wall for the container 10. The raised lip 43 in the lower shell's walls 55, 56, and 58 becomes engaged with the corresponding areas 42 in the upper shell's walls 35, 36, and 38 to contribute to securing the container closed. Though the raised lip 43 and the recessed area are preferably formed in the lower shell 50 and the upper shell 30 respectively, they may be reversed such that each is correspondingly formed in the other shell. Further, the lower shell's raised latch 51 and it's lip 52 become engaged with the upper shell's latch 31 and its lip 32 to provide an additional closed position securing feature for the container 10. Though the raised latch 51 with its lip 52 and the recessed latch 31 with its lip 32 are preferably formed in the lower shell 50 and the upper shell 30 respectively, they may be reversed such that each is correspondingly formed in the other shell.

Though the supports as described for each shell 30 and 50 of this configuration are preferable, most of the supports may be mixed and matched and other similar shaped supports may be adapted to the container 10. In particular, the right angle supports 65, the rectangular supports 61 and the square supports 64 may be alternated for each other for various uses of the container 10. Also, the T-shaped supports 62 and 63 may be swapped with the cross-like supports 60 and vice versa. Further, the positioning of these supports may also vary depending on the needs and uses of the container 10.

In a second configuration, as shown in FIGS. 5 and 6, a two piece container 10 may be formed. This container 10 may be formed of almost any plastic material, including a transparent plastic, such as polystyrene, or a flexible plastic, such as polypropolene. As shown in FIG. 5, the features of this container 10 may be identical to those described for the first configuration, except that the upper shell 30 and the lower shell 50 are hingedly connected by at least one hinge, preferably a ball and socket hinge 76, and preferably both shells 30 and 50 have rear walls 39 and 59. The ball and socket hinge 76 is preferably formed to each shell's rear wall 39 and 59. Though one hinge 76 may be employed, two or more hinges 76 are preferred.

In this configuration, the upper shell 30 has a rear wall 39, which extends perpendicularly upward from the inside floor surface 34 of the upper shell 30 and is formed to each rear corner wall 38 of the upper shell 30. The lower shell 50 also has a rear wall 59, which extends perpendicularly upward from the inside floor surface 54 of the lower shell 50 and is formed to each rear corner wall 58 of the lower shell 50. As shown in FIG. 6, preferably, the ball portion 77 of the hinge 76 is formed on the outer rear wall 39 of the upper shell 30 and extends outward. The socket portion 78 of the hinge 76 is correspondingly positioned and formed on the outer rear wall 59 of the lower shell 50 and also extends outward. A snap fit plastic hinge is constructed by mating the ball 77 and socket 78 portions of the hinge. When the ball 77 and socket 78 are joined, the upper shell 30 and the lower shell 50 become coupled to form a container 10 for storing mini-disk cartridges 13 and the like.

In a third configuration, as shown in FIGS. 7 through 11, a three piece container 10 may be constructed. Like the second configuration, this container 10 may be fashioned of almost any plastic material. Further, the features of this container 10 may be identical to those disclosed for the first configuration, except that the upper shell 30 and the lower shell 50 are joined by a detachable hinge. Preferably, the detachable hinge may be attached to the rear edges of 37 and 57 of the upper shell 50 and lower shell 50 respectively.

In one embodiment, as shown in FIGS. 7 and 8, the detachable hinge may be two living hinges 80 made of a plastic material, such as polypropolene. The upper shell's rear edges 37 and the lower shell's rear edge 57 each has at least two, but preferably four holes 82 in it. The living hinges 80 also have corresponding snaps 81 that match in size and position to the holes 82 in the rear edges 37 and 57. As shown in FIG. 8, the living hinges 80 are mated to the bottom rear edges 37 and 57, which are slightly recessed, and a snap 81, such as a mushroom snap, is inserted through the aligned holes to form a connection between the living hinge 80 and the rear edges 37 and 57 of the shells 30 and 50.

In another embodiment of the third configuration, as shown in FIGS. 9 and 11, the detachable hinge may be a hinge plate 85 made of a plastic material, such as polystyrene. As shown in FIG. 9, the upper shell's lower rear corner wall 38 and the lower shell's lower rear corner wall 58 each has a protrusion 88 extending inward. The hinge plate 85 has side walls 86, which extend perpendicularly upward from the side edges of the hinge plate 85. Each side wall 86 has two holes or depressions 87 on its outer edges. As shown in FIG. 10, the holes 87 in the hinge plate 85 are mated with the protrusions 88 on the rear corner walls 38 and 58 to couple the hinge plate 85 with each shell 30 and 50.

As shown in FIGS. 12 through 15, a fourth configuration, the height of the upper shell 30 or the lower shell 50 of the container 10 as described in the three previous configurations may be decreased to adapt to a booklet, promotional material 15 or the like, which may be held within the container 10. Also shown in FIG. 12, for this configuration, at least one, but preferably two tapered protrusions 41 may be formed to each side wall 36 or 56 such that they extend inward. The protrusions 41 should be tapered at their bottom to allow a booklet, promotional material 15, or the like to be secured in place when it is inserted under the tapered protrusion 41. The shape and size of the tapered protrusions 41, along with the type and angle of the taper, may very to adapt to various materials 15 to be enclosed with the container 10. Preferably, square supports 64 or rectangular supports 61 may be substituted for each T-shaped support 62 and 63 and crosslike support 60 as described for the previous three configurations. Preferably, the square supports 64 or rectangular supports 61 should be positioned in place of the T-shaped supports 62 and 63 and the crosslike supports 60 such that they are in parallel with the front wall 35 or 55 and so that their top surfaces become engaged with the corresponding T-shaped support 62 or 63 or crosslike support 60 when the container 10 is in the closed position.

I claim:

1. An enclosure adapted to hold at Least one object, said enclosure comprising:
    an upper shell wherein the length, the width, and the height of said upper shell are only slightly greater than the length, the width, and the height of the object and wherein said upper shell includes,
    an inside bottom surface including,
        at least one upper shell protrusion support extending upwardly from said inside bottom surface, said support having a top surface substantially parallel to said bottom surface, wherein at least one of said upper shell protrusion supports is positioned for laterally contacting the object when the object is in inserted within said upper shell,
    a pair of side walls extending upwardly from said inside bottom surface, and a front wall extending upwardly from said inside bottom surface;
    a lower shell wherein the length, the width, and the height of said lower shell are only slightly greater than the length, the width, and the height of the object and wherein said lower shell includes,
    an inside bottom surface including,
        at least one lower shell protrusion extending upwardly from said inside bottom surface said support having a top surface substantially parallel to said inside bottom surface, wherein at least one said lower shell protrusion supports is positioned for laterally contacting another object when the other object is inserted into said lower shell,
    a pair of side walls extending upwardly from said inside bottom surface, and a front wall extending upwardly from said inside bottom surface;
    wherein said top surface of said lower shell protrusion support is engageable with said top surface of said upper shell protrusion support when said enclosure is in a closed position; and connecting means for connecting said upper shell to said lower shell.

2. The enclosure of claim 1, wherein said connecting means is integrally formed with said upper shell and said lower shell.

3. The enclosure of claim 1, wherein said connecting means comprises a ball and socket hinge.

4. The enclosure of claim 3, wherein portions of said ball and socket hinge are integrally formed with said upper shell and said lower shell.

5. The enclosure of claim 1, wherein said connecting means is coupled with a rear portion of said upper shell and a rear portion of said lower shell.

6. The enclosure of claim 1, wherein said front wall of said upper shell includes a recessed portion.

7. The enclosure of claim 1, wherein said front wall of said lower shell includes a recessed portion.

8. The enclosure of claim 1, further including a first locking mechanism.

9. The enclosure of claim 8, wherein said first locking mechanism includes:
    a lower shell rim extending from said front wall of said lower shell, and
    an upper shell rim extending from said front wall of said upper shell wherein said upper shell rim corresponds in position and is complimentary in shape to said lower shell rim, and wherein said upper shell rim is matingly engageable with said lower shell rim.

10. The enclosure of claim 1, further including a second locking mechanism.

11. The enclosure of claim 10, wherein said second locking mechanism includes:
    a lower shell protrusion on a top edge of at least one of said lower shell walls, and
    an upper shell depression in a top edge of at least one of said upper shell walls wherein said upper shell depression corresponds in position and is complimentary in shape to said lower shell protrusion, and wherein said upper shell depression is matingly engageable with said lower shell protrusion.

12. The enclosure of claim 1, wherein at least one of said shell protrusion supports is substantially T-shaped in cross-section.

13. The enclosure of claim 12, wherein a portion of said T-shaped protrusion support is tapered such that a cross-section of said protrusion increases with increasing distance from said surface.

* * * * *